Oct. 20, 1959      C. R. SHIPP      2,908,932
RACK FOR VENETIAN BLINDS
Filed Jan. 4, 1957      2 Sheets-Sheet 1
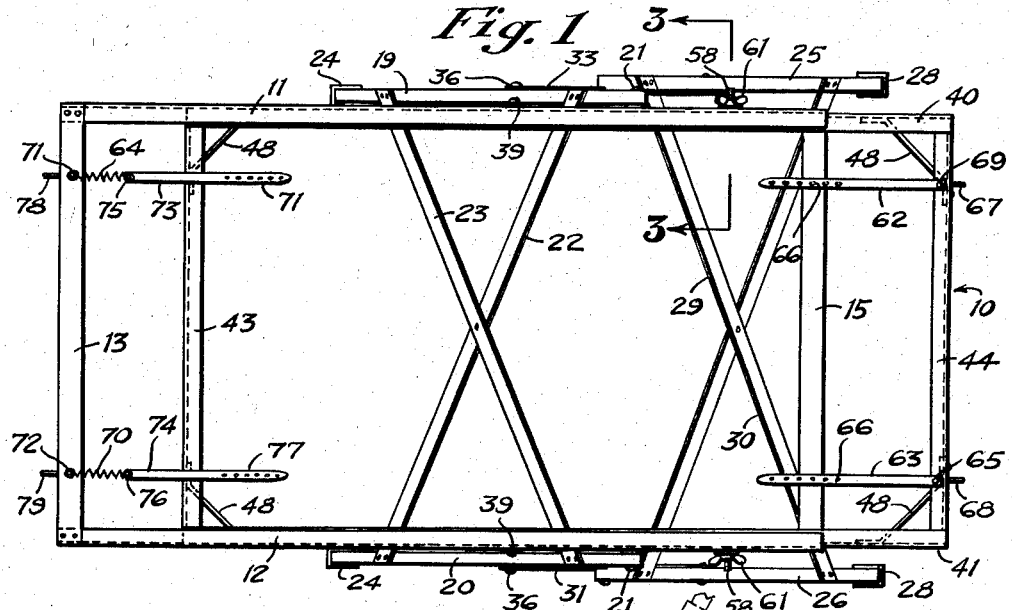
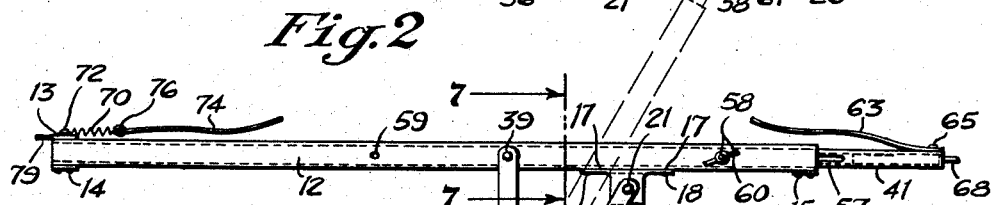
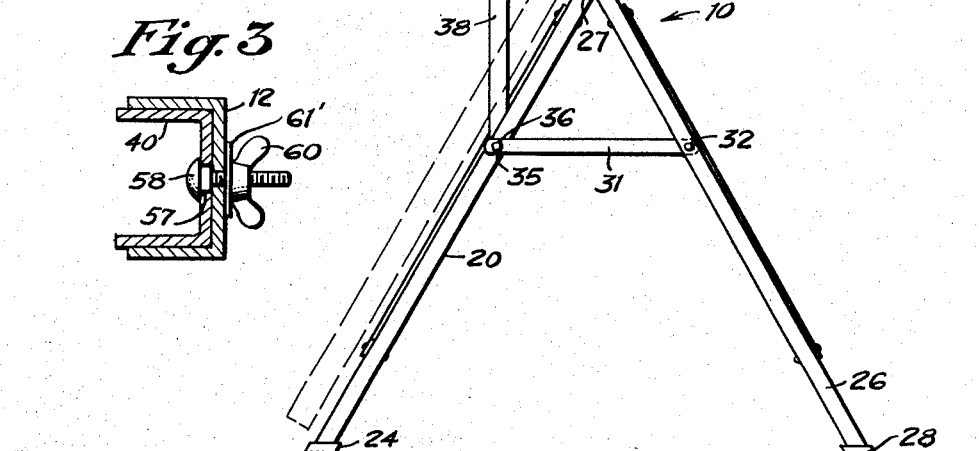
INVENTOR.
CLYDE R. SHIPP
BY
Patrick D. Beavers
ATTORNEY Oct. 20, 1959 C. R. SHIPP 2,908,932
RACK FOR VENETIAN BLINDS
Filed Jan. 4, 1957 2 Sheets-Sheet 2
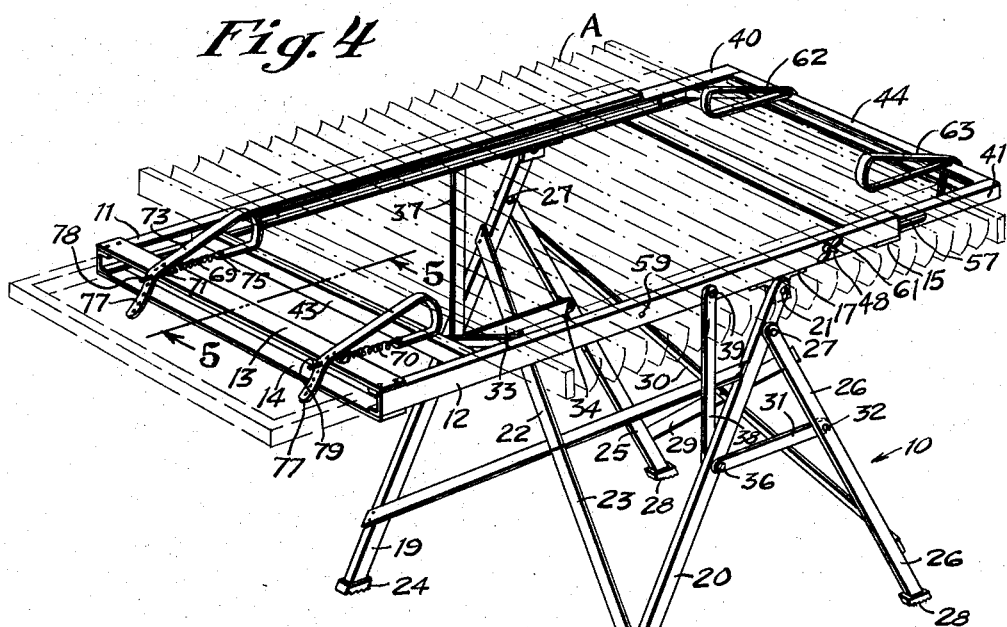
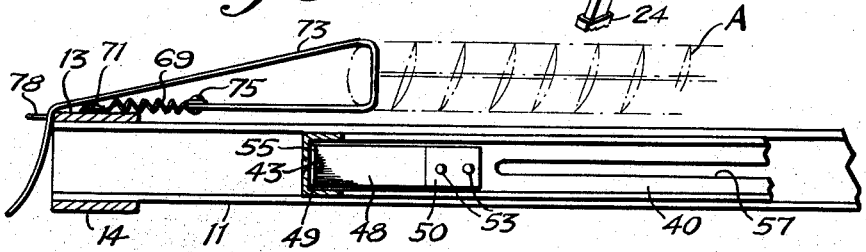
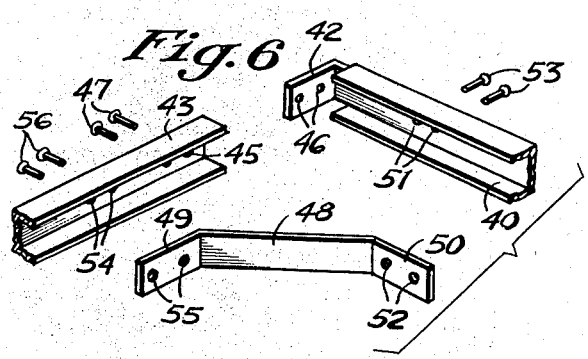
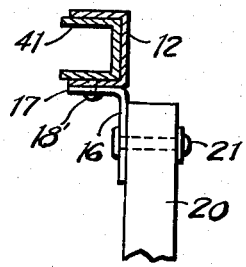
INVENTOR.
CLYDE R. SHIPP
BY
*Patrick D. Beaven*
ATTORNEY

United States Patent Office 2,908,932
Patented Oct. 20, 1959

2,908,932

RACK FOR VENETIAN BLINDS

Clyde R. Shipp, Norfolk, Va.

Application January 4, 1957, Serial No. 632,448

1 Claim. (Cl. 15—268)

This invention relates to improvements in racks for holding Venetian blinds while they are being cleaned.

An object of this invention is to provide a rack that will retain a Venetian blind at a 30 degree angle, in a horizontal position or at any position that is desired for the proper cleaning of the Venetian blind.

The Venetian blinds may be dry cleaned or scrubbed with a cleaning solution using any type of suitable brush, sponge or rag.

The Venetian blinds may be installed on the rack and cleaned indoors by folding the rack into closed or storing position and placing the rack in a bath tub. The Venetian blinds may be cleaned outside by opening the rack into operative position and scrubbing the Venetian blinds and then rinsing them with water from a garden hose.

The Venetian blinds may be dried on the rack and then rehung.

The use of the rack will have a housewife considerable time and much of the drudgery and back breaking labor that accompanies the cleaning of Venetian blinds at the present time.

The use of the rack will also save water and cleaning materials.

With the above and other objects and advantages in view, the invention consists of the novel details of construction, arrangement and combination of parts more fully hereinafter described, claimed and illustrated in the accompanying drawings, in which:

Fig. 1 is a top plan view of a rack embodying the invention in operative position;

Fig. 2 is a side elevational view of Fig. 1;

Fig. 3 is a transverse sectional view on the line 3—3 of Fig. 1;

Fig. 4 is a perspective view of the rack showing a Venetian blind in position on the rack;

Fig. 5 is a sectional view on the line 5—5 of Fig. 4;

Fig. 6 is a blownup view of a corner of the secondary frame; and

Fig. 7 is a sectional view on the line 7—7 of Fig. 2.

Referring more in detail to the drawings, wherein like parts are designated by like reference numerals, the reference numeral 10 is used to generally designate a rack embodying the invention.

The rack 10 comprises a main frame of rectangular formation having channel shaped side bars 11 and 12, respectively, which are joined at one of their ends by parallel end bars 13 and 14 that are secured to the flanges of the channel members 11 and 12 in any suitable manner. The opposite ends of the bars 11 and 12 are joined by one crossbar 15 secured to the lower flange of the bars 11 and 12 in any suitable manner.

L-shaped bearing members 16 are provided with laterally extending flanges 17 that are secured to the undersurface of the lower flange of the side bars 11 and 12, respectively, by any suitable fasteners 18. Main leg members 19 and 20, respectively, are pivotally secured to the bearing members 16 by pivot pins 21. The leg members 19 and 20 are joined in spaced parallel relation to each other by diagonally disposed braces 22 and 23, respectively. Rubber pads 24 are secured to the lower ends of the leg members 19 and 20 to prevent slipping of the leg members 19 and 20, respectively.

Secondary leg members 25 and 26, respectively, are pivotally connected to the leg members 19 and 20, respectively, by pivot pins 27. The pivot pins 27 are positioned in the leg members 19 and 20, respectively, adjacent the pivot pins 21 and the leg members 25 and 26, respectively, are of a size so that they terminate at the same length as the leg members 19 and 20, respectively. Rubber pads 28, similar to the rubber pads 24, are secured to the lower ends of the leg members 25 and 26 for the same reason.

The leg members 25 and 26 are joined in spaced parallel relation to each other by diagonally disposed braces 29 and 30, respectively.

A latch bar 31 is pivoted at 32 to the leg member 26 and a latch bar 33 is pivoted at 34 to the leg member 25.

The free end of each of the latch bars 31 and 33 are provided with a notch 35, which engages a lock bolt 36. There is a lock bolt 36 in each of the leg members 19 and 20 so that the latch bars 31 and 33 retain the leg members 19 and 20, and 25 and 26, respectively, in fixed angular relation to each other. Frame retaining bars 37 and 38, respectively, are pivotally connected to the channel members 11 and 12, respectively, by pivot pins 39 and the free ends of the bars 37 and 38 are also provided with notches to engage the lock bolts 36 in the leg members 19 and 20, respectively. A secondary frame of rectangular formation has channel shaped side bars 40 and 41, respectively, that are slidably mounted in the channel shaped members 11 and 12 of the main frame of the rack 10.

Each end of the side bars 40 and 41 is provided with an extension tongue 42 which engages the opposite ends of the channel shaped end bars 43 and 44, respectively.

The ends of the end bars 43 and 44 and the tongues 42 are provided with a pair of spaced openings 45 and 46, respectively, so that when their openings are alined, fasteners 47 will rigidly secure the ends of the side bars 40 and 41 to the ends of the end bars 43 and 44, respectively. A diagonal brace 48 is provided with end flanges 49 and 50, respectively, and a brace 48 is positioned at each corner of the secondary frame.

Each end of the side bars 40 and 41, respectively, is provided with a pair of spaced openings 51 that are adapted to be alined with a pair of spaced openings 52 in the flange 50 of each of the braces 48 so that fasteners 53 will enter the openings to retain the braces 48 in rigid relation to the side bars 40 and 41, respectively. Each end of the end bars 43 and 44 are provided with a pair of spaced openings 54 inwardly of the openings 45 that are adapted to be alined with the openings 55 in the flange 49 of the braces 48 so fasteners 56 will enter the openings to retain the braces 48 in rigid relation to the end bars 43 and 44, respectively. Thus, the braces 48 will maintain the secondary frame in shape at all times.

Each of the side bars 40 and 41 of the secondary frame is provided with an elongated slot 57 that is engaged by a bolt 58 that is adapted to be selectively received in the openings 59 and 60, respectively, in the side bars 11 and 12, respectively, of the main frame. A wing nut 61 and a washer 61' is mounted on each of the bolts 58 outwardly of the channel members 11 and 12 of the main frame and when the wing nuts 61 are tightened, the two frames will be retained in fixed relation to each other. The openings 59 will receive the bolts 58 to permit the rack 10 to support short Venetian blinds and the openings 60 will receive the bolts 58 to permit the rack 10 to support long Venetian blinds. Thus, the rack is adapted to support short or long Venetian blinds.

A pair of straps 62 and 63, respectively, are secured at 64 and 65, respectively, to the end bar 44 of the secondary frame in spaced relation to each other. Each of the straps 62 and 63, respectively, is provided with relatively spaced openings 66 that are adapted to selectively receive the tongues 67 and 68, respectively, that extend outwardly of at right angles to and are secured to the end bar 44.

A pair of springs 69 and 70 are secured at 71 and 72, respectively, to the end bar 13 of the main frame and a strap 73 is secured to the free end of the spring 69 at 75, while a strap 74 is secured to the free end of the spring 70 at 76.

Each end of the straps 73 and 74 is provided with relatively spaced openings 77 that are adapted to selectively receive the tongues 78 and 79, respectively, that extend outwardly of at right angles to and are secured to the end bar 13 of the main frame.

As disclosed, the rack 10 is made of a metal such as aluminum or any other suitable rust resistant material, however, the rack 10 may also be made of a treated wood or plastic.

In operation, the rack is unfolded into operative position, as shown in Figs. 1, 2 and 4. A Venetian blind A is positioned on the rack 10 so that the straps 62 and 63 may encircle the bottom or top rail of the Venetian blind A and the straps 73 and 74 my encircle the opposite end of the Venetian blind A.

The rack 10 is adjustable for a long or short Venetian blind and the straps 62 and 63 are engaged with the tongues 67 and 68, respectively. The straps 73 and 74 are then drawn tight and fastened to the tongues 78 and 79, respectively, and the springs 69 and 70 will retain the Venetian blind in taut condition on the rack 10.

The cords on the Venetian blind are pulled to close the slats and that side is cleaned. The cords are again pulled to expose the opposite side of the slats which is also cleaned.

The method of cleaning of the Venetian blind is left to the user of the rack 10, since such operation does not form a part of the invention.

By releasing the latch bars 38 and 39, the frames may be moved to the dotted line position, as shown in Fig. 2. By releasing the latch bars 31 and 33, the rack 10 may be folded. In operative position the Venetian blind may be cleaned outdoors, in folded position the Venetian blinds may be cleaned indoors in a bath tub or wash tub.

The straps 62, 63, 73 and 74 may be made of leather, plastic, cloth webbing or any suitable material that will not damage the painted surface of the Venetian blind. The tongues may also be replaced with buckles, if desired.

The size of the frames may be varied to fit Venetian blinds of any suitable length by changing the overall length of the frames, and more openings for the lock bolts may also be provided in larger frames to compensate for various lengths of Venetian blinds.

It is believed that from the foregoing description that the construction and manner of use of the rack will be apparent to those skilled in the art and it is to be understood that changes in the minor details of construction, arrangement and combination of parts may be resorted to provided they fall within the spirit of the invention and scope of the appended claim.

Having thus described the invention what is claimed as new and desired to be secured by Letters Patent is:

A rack for holding a Venetian blind for cleaning comprising a main frame, an extension frame slidably mounted and extending from one end of said main frame, a first pair of legs pivotally mounted on said main frame, a second pair of legs pivotally mounted on said first legs, means for latching said first legs in angular relation to said second legs, said frame being pivoted to said legs in overcenter condition whereby to normally rest against one pair of said legs, contractible straps carried by the outer ends of said frames for mounting a Venetian blind thereon, and means for latching said frame and its extension to said legs in a horizontal position with relation to the ground.

References Cited in the file of this patent
UNITED STATES PATENTS

| | | |
|---|---|---|
| D.170,672 | Zalkind | Oct. 20, 1953 |
| 676,337 | Nichols | June 11, 1901 |
| 680,855 | George | Aug. 20, 1901 |
| 974,600 | Robinson | Nov. 1, 1910 |
| 2,345,232 | Boushelle | Mar. 28, 1944 |

FOREIGN PATENTS

| | | |
|---|---|---|
| 34,740 | Sweden | July 3, 1911 |
| 960,923 | France | Nov. 7, 1949 |